(12) United States Patent
Doganata et al.

(10) Patent No.: US 6,341,314 B1
(45) Date of Patent: Jan. 22, 2002

(54) WEB-BASED VIRTUAL COMPUTING MACHINE

(75) Inventors: Yurdaer Nezihi Doganata, Chestnut Ridge; Franco Marconcini, New York; Magda Mahmoud Mourad, Yorktown Heights, all of NY (US); Jonathan P. Munson, Chapel Hill, NC (US); Giovanni Pacifici, New York; Asser Nasreldin Tantawi, Somers, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,473

(22) Filed: Mar. 30, 1999

(51) Int. Cl.[7] .............................................. G06F 13/00

(52) U.S. Cl. ...................................... 709/229; 709/220

(58) Field of Search ................................. 709/225, 203, 709/229, 220, 205

(56) References Cited

U.S. PATENT DOCUMENTS

| | | | | | |
|---|---|---|---|---|---|
| 4,780,821 A | * | 10/1988 | Crossley | ....................... | 709/100 |
| 5,974,446 A | * | 10/1998 | Sonnenreich et al. | ........ | 709/204 |
| 6,058,416 A | * | 5/2000 | Mukherjee et al. | .......... | 709/203 |
| 6,195,685 B1 | * | 2/2001 | Mukherjee et al. | .......... | 709/205 |
| 6,233,600 B1 | * | 5/2001 | Salas et al. | .................. | 709/201 |

* cited by examiner

Primary Examiner—Kenneth R. Coulter
(74) Attorney, Agent, or Firm—Scully, Scott, Murphy & Presser; Douglas W. Cameron, Esq.

(57) ABSTRACT

The present invention is a Web based operating system that provides general access to resources distributed throughout the Internet. It provides a graphical user interface through which users may perform common "desktop" operations, such as invoking applications, copying files, and setting sharing attributes of files, and translate them to the operations that are appropriate for the resources that are the target of the request. Additionally, the invention provides a general-purpose attribute store or registry to keep the persistent state needed by the WebTop and other applications, including users preferences, application-invocation information, and application settings and any other attribute-type information.

32 Claims, 2 Drawing Sheets

WEB-BASED VIRTUAL COMPUTING MACHINE

BACKGROUND OF THE INVENTION

1. Field of the Invention

This invention relates to operating systems, and more specifically, to Web based operating systems that give users general access to arbitrary resources distributed throughout the Internet.

2. Description of Prior Art

The Internet provides a platform independent infrastructure that connects geographically dispersed users and applications in a unified manner. It is the fastest growing network, richest in application development and open to all systems.

Furthermore, the World-Wide Web provides an environment that allows a wide range of applications to run on different platforms. However, these are typically stand-alone applications, with their own proprietary data and resource structures, and thus largely blocked from interaction with other applications. As a result, users are forced to deal with a wide variety of inconsistent user interfaces. Moreover, users may be required to authenticate themselves to each site they visit, using potentially a different user name and password for each site.

Modern personal computer operating systems allow users to conveniently and efficiently perform all permissible operations on resources through visual direct manipulation including deleting objects, adding new objects, modifying existing objects, and changing objects' attributes. The integration of resources that makes such ease of use possible is a direct benefit of modern personal computer operating systems. To achieve a similar integration of resources distributed throughout the Internet, it would be desirable to have an Internet-distributed unifying operating system, however, considering the variety of systems and applications, complete integration by such a system is not a practical solution. What is needed, is an alternative Internet operating system for a web-based desktop environment.

Other systems have addressed this problem, but in restrictive or incomplete ways. Lotus Notes™ for example, is a system that provides a complete user environment for distributed resources, however it is restricted to Notes applications and cannot integrate generic Web-based applications. There are a number of recently implemented systems that are more web oriented, such as DocuShare, Instant TeaRoom, and eRoom, however those systems offer only a subset of desktop functions including certain file operations. Furthermore, rather than achieving an individualized, per-user, integration, those systems integrate on a per-group basis to create shared resource sets, in contrast to the individualized desktops enjoyed by personal computer users.

There exists a need for a system that can integrate applications and resources distributed over the Internet, to create a unified virtual computing environment similar to those which modern desktop operating systems create for local resources. Consider for example a user who uses both a web-based e-mail and a web-based fax application. Whereas with the local desktop versions of those applications the user may easily select an e-mail message and indicate that it is to be faxed, this action would not be possible for the web-based applications without a special cooperation between the two applications. The reason for this is that web-based applications do not have a common means of resource management.

Similarly, there exists a need for an authentication service to automatically authenticate users registered with each of the web sites providing services such as the e-mail and fax applications, in contrast to the current practice of requiring users to authenticate themselves to each application.

SUMMARY OF THE INVENTION

The object of this invention is to provide a web-based operating system that gives its users general access to arbitrary resources distributed throughout a public network of computers, specifically the Internet. The object is achieved using the same or similar visual techniques of direct manipulation that are commonly provided in modern personal computing operating systems. The users of the system have their own web-based data storage subsystems and file management tools that allow them to register web-based applications, set preferences and profiles, run applications, share files and folders to provide full interactivity as they would do on a desktop machine running a particular operating system.

The invention increases the flexibility of the Internet by introducing means for integration of data, applications and resources dispersed over the network. It consists of a software module hereinafter referred to as "WebTop" which executes on the user's client workstation, and a software module hereinafter referred to as "WebBase" which executes on a Web server and responds to various WebTop requests.

The function of the WebTop is to provide a graphical user interface through which users may perform common "desktop" operations, such as invoking applications, copying files, and setting sharing attributes of files, and translate them to the operations that are appropriate for the resources that are the target of the request. For example, selecting a Web server hosted file and dragging it into another folder may be translated as HTTP PUT and DELETE methods. The WebTop may also provide an API so that applications aware of the WebTop, can perform the same set of functions as available through a GUI.

The WebBase serves as a general-purpose attribute store or registry to keep the persistent state needed by the WebTop and other applications, including users preferences, application-invocation information, and application settings and any other attribute-type information.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

Figure 1:
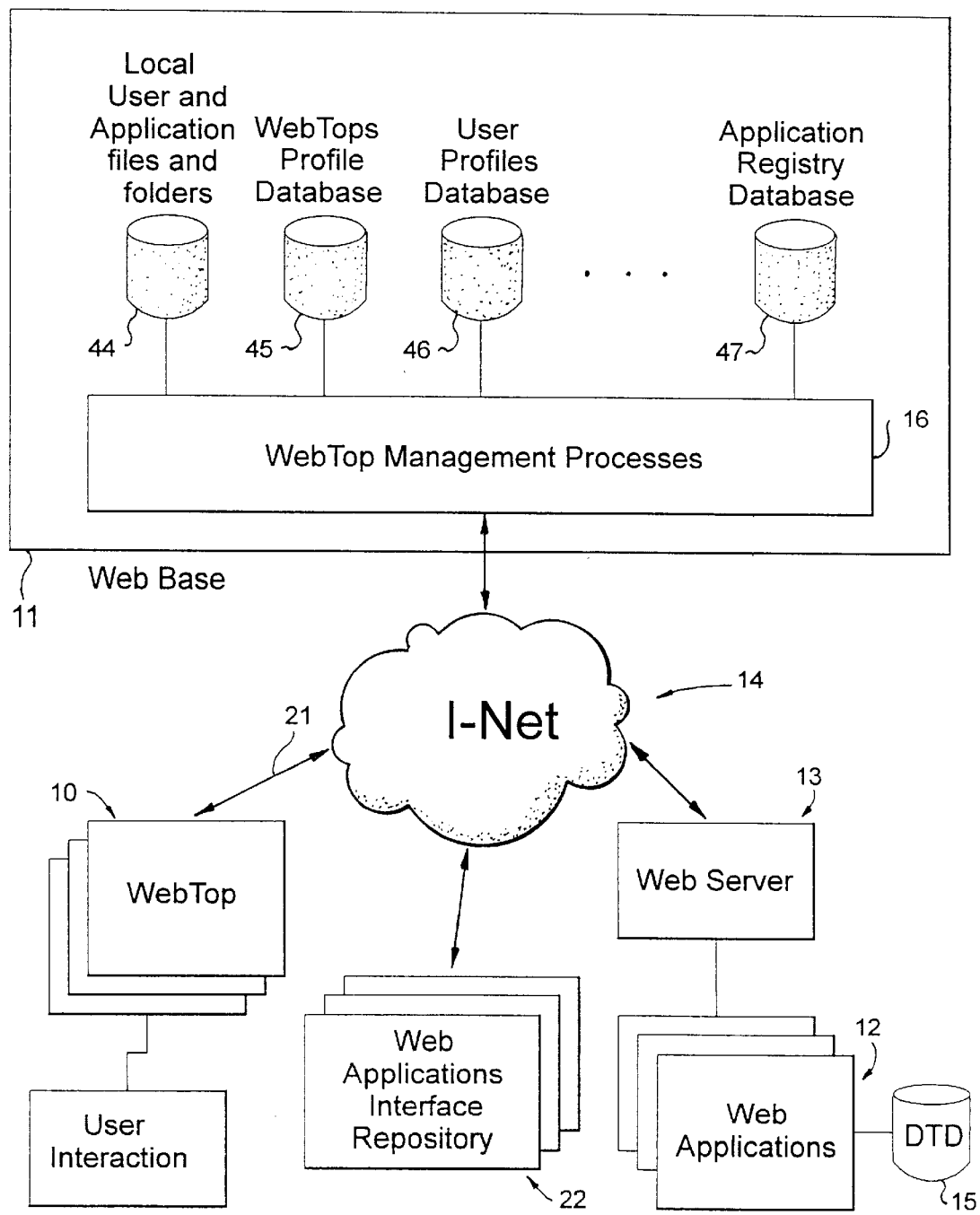
FIG. 1 is a diagram of the main components of the Web based virtual computing system.

FIG. 1 shows a WebTop software module 10 which provides for the customized view of the user files and applications on the Internet. The WebTop 10 may be housed on any machine that offers dynamic program load over the Internet 14. The dynamic program load may be implemented with a Java-enabled Web browser.

WebBase 11 is an Internet-accessible server system consisting of some processes and databases, used for the integration and automation of Web applications 12. Users may log in to the WebBase 11 through the WebTop 10. WebBase 11 has means to access Web Applications 12 controlled by Web Server 13 and distributed over the Internet 14. Web Application Interface Repository 22 contains the definitions of the functional interfaces between the Web sites and Web applications 12 that may be accessed by the WebBase 11. The WebBase 11 acts as an intermediary between users of the WebTop 10 and Web Applications 12 and uses a set of WebTop Management Processes 16 to perform tasks for managing users of WebTop 10 and Web Applications 12.

Figure 2:
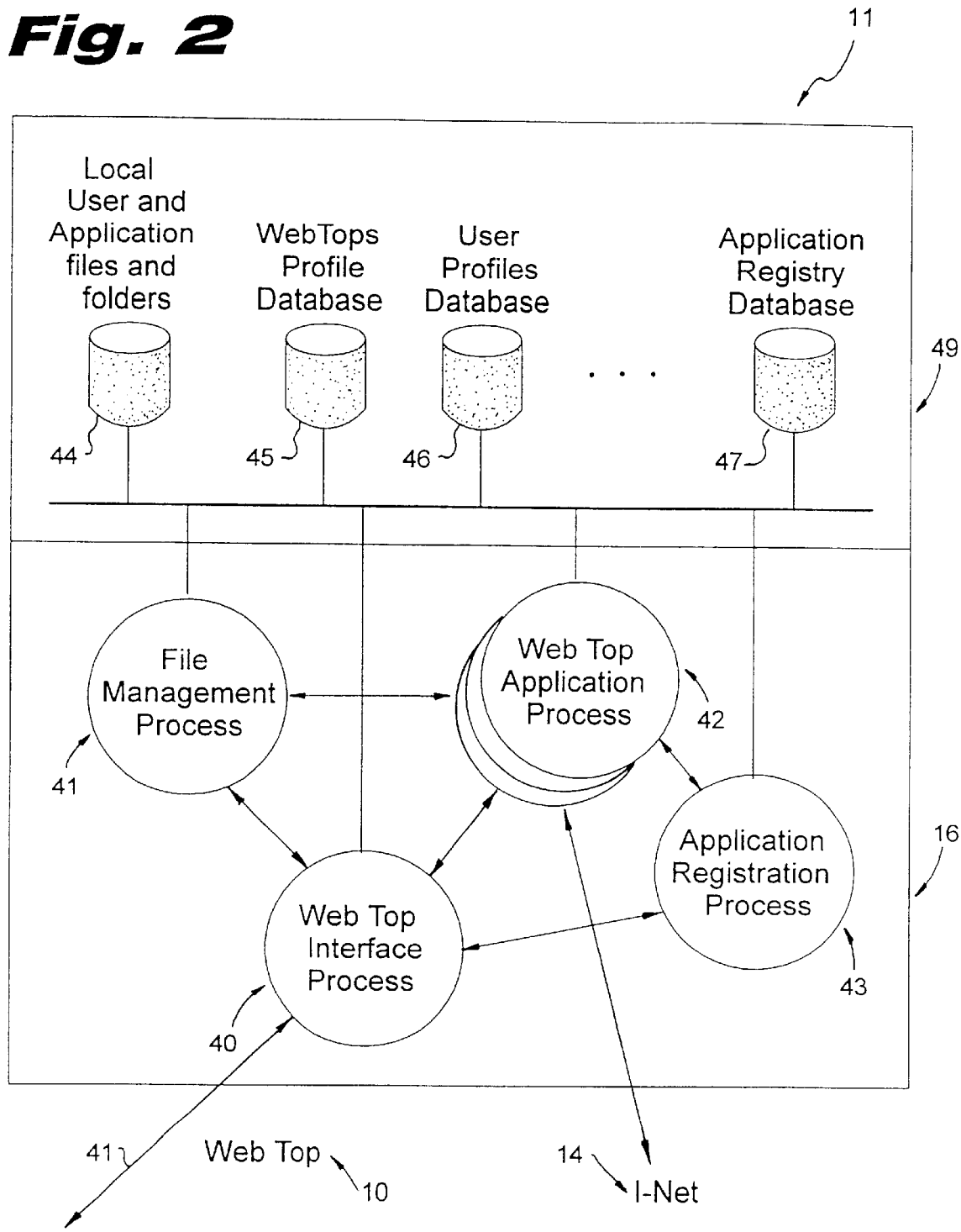
FIG. 2 is a detailed diagram WebTop Management Processes, and of WebBase databases.

WebTop Management Processes 16 are shown in detail in FIG. 2 as including: a WebTop Interface Process 40, a File Management Process 41, a WebTop Application Process 42, and an Application Registration Process 43. Each of the WebTop management processes 16 interface with one another and access a set of databases 49 in order to perform the overall WebBase management functions. Particularly, WebBase 11 maintains the following databases:

Application Registry Database 47 used to register WebBase applications. Key parameters required to run an application are registered in this database. Similar to a desktop operating system registry, the Application Registry Database 47 contains application specific settings and configuration information. Moreover, unlike registry files or initialization files in a desktop system, this database also contains interface information about Web sites to be accessed during runtime.

Local User and Application Files and Folders Database 44 includes all the user and application local files and folders. These local files residing in this database 44 are accessed by the File Management Process 41 and users may perform all the file manipulations from their WebTops 10 by using traditional GUI methods such as dragging and dropping files into folders. Applications may also access and manipulate these files through File Management Process 41, which manages a local file system in the WebBase 11. Such a file system encompasses information about users, e.g., folders, user documents and objects, user views, etc., and applications, such as handles to applications, application state, application code, application interfaces, etc.

Web Tops Profile Database 45 is a repository for the customized WebTop views of individual users. A typical item in this database is the description of the WebTop view with types of icons used, their locations, sizes and associations. After the initial login and the authentication process, the most recent WebTop view that is used and saved by the user is brought back to the WebTop. A user may have multiple WebTop views.

User Profiles Database 46 is a repository for the user preference and profile information. A typical item in this database may contain user identification and authentication information, application preferences or passcodes, user location and contact information, user connectivity options, etc.

The WebTop user interface process 40 provides WebTop users with conventional windows, icons, and menus. There are one or more distinguished windows, known as WebTop root windows, only one of which may be open at all times. When open, a root window fills the screen display, and which may not be hidden and may not obscure any other window. The WebTop 10 offers a special interface to switch among root windows. Aside from these root windows restrictions, windows may overlap each other arbitrarily.

Windows represent ordered icon collections, where icons can represent either Web-hosted applications or data objects. The WebTop 10 provides means for users to change the order of the icons in a window. Icons are arranged in rows for display purposes. Icon collections may be nested within each other. A collection within another collection is represented as a folder icon. Folders and their contents are stored for each user in the local data store 44. Icons may be dragged from one collection and dropped into another, which signifies a copy from one collection to another. An icon dragged onto an application icon, signifies invocation of the application with the dragged object as a parameter. Icon operations include: i. selection; ii. invocation; and iii. drag-and-drop.

WebTop 10 additionally provides means to query the WebBase 11 for presentation of a list of allowable operations on the object which may be selected by a user, e.g., by single-clicking of a computer pointing device such as a mouse. The selected operation may be the input to a future operation, e.g., through clicking of the right-most mouse button. WebBase 11 provides means of associating an icon object with an application from the application's entry in Application Registry Database 47. The WebBase 11 returns a list of operations that may be performed on the object represented by the selected icon.

Upon double-clicking on an application icon, the WebTop 10 requests that the WebBase 11 launch (invoke, load) the application represented by the icon. Web applications are invoked by the WebBase 11 through the execution of automation applications such as macros and batch files. For each WebTop 10 Web application, there is a corresponding automation application in the WebBase 11 that is invoked when the Web application is activated from the WebTop. The WebBase 11 then retrieves the application code from the Application Registry Database 47, and starts a new Web Top Application process 42 in which the automation application will run.

Automation applications have two primary purposes. The first purpose is to automate what would otherwise be manual sequences of Web requests, such as logging in and navigating through a series of Web pages. Automation applications have access to user information stored in the WebBase, such as application-specific user IDs and passwords.

The second purpose is to integrate independent Web applications by retrieving information from one or more of them, do some intermediate processing on the retrieved data, and invoke other applications using this retrieved data. Automation applications may be written in a generally-purpose programming language such a Java.

As shown in FIG. 2, the WebTop Interface Process 40 manages the interaction between the WebTop 10 and the WebBase 11. Such an interaction may include the management of user's sessions, user authentication, WebTop capabilities negotiation, handling of user requests and logging user activity. The user requests are received and responses are sent by the WebTop Interface Process 40. As an example, a user's request to invoke a Web Application 12 is first received by the WebTop interface process 40. The request is then passed to Application Registration Processes 43 to check if the Web application is registered in Application Registry Database 47. If the Web Application 12 (FIG. 1) to be invoked is not registered, then the user's request to invoke the Web Application 12 (FIG. 1) is passed to the Application Registry Process 43. The Application Registration Process 43 handles the registration of Web Applications 12 (FIG. 1) to the Application Registry Database 47 within the WebBase 11.

The application registration process involves storing information in the WebBase 11 about the location of the Web Application 12 (FIG. 1), the protocol, i.e., a sequence of steps, for accessing such an application, and the interface specification for the application. The registry information is either received directly from the Web site or from a repository on the Internet. Web Application Interface Repository 22 (FIG. 1) is such a repository for accepting and storing the registry information of the Web sites. New Web Applications are registered with the Web Application Interface Repository 22 (FIG. 1) to allow fast and effective access to them.

If the Web Application 12 (FIG. 1) is registered in the Application Registry Database 47, then the Application Registry Process 43 reads the interface requirements of the Web Application 12 (FIG. 1) from the Application Registry Database 47 as well as the user profile information to be used for invocation from the User Profiles Database 46. The information regarding the user and the Web site is then passed to the WebTop application process 42 which checks in to the Web site over the Internet 14 on behalf of the user, performs the required transactions, and returns the results to the user's WebTop 10 via WebTop Interface Process 40. The results may be returned in the form of a Web page.

If the Web site or the Web Application 12 (FIG. 1) is neither registered to Web Application Interface Repository 22 (FIG. 1) nor contains any registry information, then Application Registration Process 43 extracts the application interface information by parsing the HTML pages that are retrieved from the Web Application site. If the Web Application Process 42 needs user intervention, it sends a request to user's WebTop regarding the required user information to be filled in by the user.

Customized WebTop Application Processes 42 may be used to integrate different Web Applications 12 (FIG. 1). Web Application Process 42 invokes the first application by using the application interface information, that may be retrieved from the Application Registry Database 47, receives and passes the result of the first invocation to be used as input to the second application.

As an example, let first application be an e-mail application. Web Application Process 42 logs in to e-mail Web Application 12 (FIG. 1), such as yahoo mail, hotmail, usa.net, etc., retrieves the e-mail on behalf of the user and passes it to the WebTop 10. The user highlights a word that is in the body of the mail and sends a request to the Web Application Process 42 to invoke a second Web Application to do a search on the highlighted word on a particular search engine. The Web Application Process 42 receives the highlighted word and the name of the search engine, reads the selected search engine application interfaces from the Application Registry Database 47 and invokes the search engine with the highlighted word being the key word.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A system for controlling resources distributed throughout a computer network and providing access to said resources from a client computer terminal, said system comprising:
   one or more client computers connected to said network for providing a graphical user interface for enabling said client computers to perform operations on said distributed resources via said network as well as on local resources; and
   one or more servers connected to said network for storing files and settings of each of said client computers and for executing said resources responsive to commands initiated by said client computers, said servers comprising:
   an application processing means for executing automation applications to enable automatic interaction between each of said client computers and said distributed resources;
   an application registration means to register and store information including a location interface specification for each of said distributed resources; and
   a means for said automation applications to exchange data between two or more of said resources.

2. The system of claim 1, wherein said operations on said distributed resources comprise invoking applications, copying files, setting sharing attributes of files, and translating said attributes of files to operations that are appropriate for said distributed resources.

3. The system of claim 2, wherein each of said servers further comprises user files and settings which include configurations, profiles, user preferences, application-invocation information, application settings, attribute information, and information registry.

4. The system of claim 3, wherein said distributed resources are registered by said application registration means and executed by said application processing means with a single invocation from said client computers.

5. The system of claim 4, wherein said automation applications are encoded as scripts and binary executable programs, and invoke a sequence of HTTP requests that appear to said user as a single interaction with said distributed resources.

6. The system of claim 5, further comprising a means to manually and programmatically register and store said automation applications.

7. The system of claim 6, wherein said automation applications use said location interface specification to access each of said distributed resources.

8. The system of claim 7, wherein each of said servers further comprises remote interface repositories for registering and storing each said location interface specification.

9. The system of claim 8, wherein said automation applications are automatically updated when said location interface specification is added, removed, or modified.

10. The system of claim 9, wherein said computer network is Internet.

11. A method for controlling resources distributed throughout a computer network and providing access to said resources from client computer's terminals via one or more servers connected to said network, said method comprising the following steps:
   storing files and settings of each said client computer on said servers;
   registering and storing information including a location interface specification for each of said distributed resources on said servers;
   receiving commands communicated by said client computers;
   executing said resources in response to commands initiated by said client computers; and
   executing automation applications to enable automatic interaction between each of said client computers and said resources, said automation applications exchanging data between two or more said distributed resources.

12. The method of claim 11, wherein said client computers provide a graphical user interface for enabling users to perform operations on said distributed resources via said network as well as on local resources.

13. The method of claim 12, wherein said operations on said distributed resources comprise invoking applications, copying files, setting sharing attributes of files, and translating said attributes of files to operations that are appropriate for said distributed resources.

14. The method of claim 13, wherein each said of servers comprises user files and settings which include configurations, profiles, user preferences, application-invocation information, application settings, attribute information, and information registry.

15. The method of claim 14, wherein said distributed resources are registered and executed with a single invocation from said client computers.

16. The method of claim 15, wherein said automation applications are encoded as scripts and binary executable programs, and invoke a sequence of HTTP requests that appear to said user as a single interaction with said distributed resources.

17. The method of claim 16, further comprising a step to manually and programmatically register and store said automation applications.

18. The method of claim 17, wherein said automation applications use said location interface specification to access each of said distributed resources.

19. The method of claim 18, wherein each of said servers comprises remote interface repositories for registering and storing each said location interface specification.

20. The method of claim 19, wherein said automation applications are automatically updated when said location interface specification is added, removed, or modified.

21. The method of claim 20, wherein said computer network is Internet.

22. A computer program device readable by a machine, tangibly embodying a program of instructions executable by a machine to perform method steps for controlling resources distributed throughout a computer network and providing access to said resources from client computers' terminals via one or more servers connected to said network, said method comprising the following steps:

storing files and settings of each said client computer on said servers;

registering and storing information including a location interface specification for each of said distributed resources on said servers;

receiving commands communicated by said client computers;

executing said resources in response to commands initiated by said client computers; and executing automation applications to enable automatic interaction between each of said client computers and said distributed resources, said automation applications exchanging data between two or more said distributed resources.

23. The computer program device of claim 22, wherein said client computers provide a graphical user interface for enabling users to perform operations on said distributed resources via said network as well as on local resources.

24. The computer program device of claim 23, wherein said operations on said distributed resources comprise invoking applications, copying files, setting sharing attributes of files, and translating said attributes of files to operations that are appropriate for said distributed resources.

25. The computer program device of claim 24, wherein each of said servers comprises user files and settings which include configurations, profiles, user preferences, application-invocation information, application settings, attribute information, and information registry.

26. The computer program device of claim 25, wherein said distributed resources are registered and executed with a single invocation from said client computers.

27. The computer program device of claim 26, wherein said automation applications are encoded as scripts and binary executable programs, and invoke a sequence of HTTP requests that appear to said user as a single interaction with said distributed resources.

28. The computer program device of claim 27, further comprising a step to manually and programmatically register and store said automation applications.

29. The computer program device of claim 28, wherein said automation applications use said location interface specification to access each of said distributed resources.

30. The computer program device of claim 29, wherein each of said servers comprises remote interface repositories for registering and storing each said location interface specification.

31. The computer program device of claim 30, wherein said automation applications are automatically updated when said location interface specification is added, removed, or modified.

32. The computer program device of claim 31, wherein said computer network is Internet.

* * * * *